June 13, 1967  E. BLANCO  3,324,908
METHOD OF JOINING MEMORY MATERIALS AND JOINTS FORMED THEREBY
Filed July 21, 1965

ELIAS BLANCO
INVENTOR.

BY *Url R. Goshaw*

ATTORNEY

United States Patent Office 3,324,908
Patented June 13, 1967

3,324,908
METHOD OF JOINING MEMORY MATERIALS AND
JOINTS FORMED THEREBY
Elias Blanco, 8262 Fountain Ave.,
Los Angeles, Calif. 90046
Filed July 21, 1965, Ser. No. 473,723
5 Claims. (Cl. 144—318)

This invention relates to a method of joining pieces of wood or like memory materials, and particularly to a method which requires no nails, screws, glue, or other conventional attaching means.

Joints for wood using mortises and adhesives are well known, the present invention using novel types of construction which require no conventional fastening means, such as nails, screws, straps, etc. The joints formed with the new method of construction are particularly economical, weatherproof, and permanent, while providing the maximum in strength between the elements joined together. Basically, the construction utilizes a property of the material being joined which permits the material previously deformed to return substantially to its original form. This property is generally called "memory."

The principal object of the invention, therefore, is to facilitate the joining of pieces of wood or like material without conventional fastening means.

Another object of the invention is to provide a joint between two pieces of wood or material of like properties which provides a permanent interlock with maximum strength.

A further object of the invention is to provide an improved and interlocking, economical joint between a mortised element and an engaging element.

Figure 4:
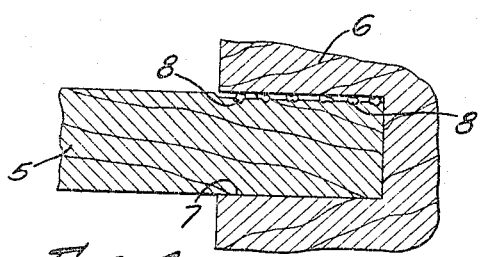
Figure 9:
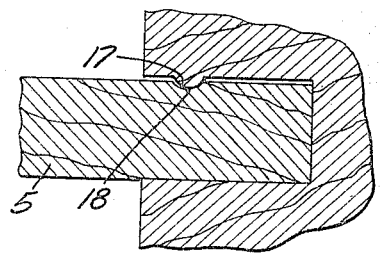
Figure 5:
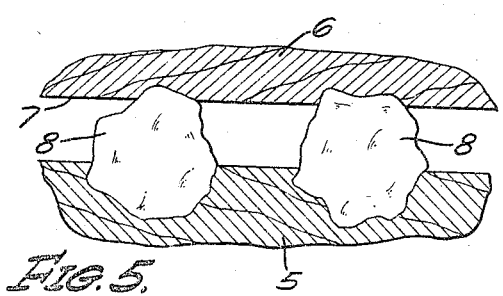

A better understanding of this invention may be had from the following description when read in conjunction with the accompanying drawings, in which:

FIGS. 1 to 4, inclusive, are cross-sectional views illustrating the stages used in making a joint having one type of construction embodying the invention;

FIG. 5 is an enlarged detailed view of the joint shown in FIG. 4; and

FIGS. 6 to 9, inclusive, are cross-sectional views showing another joint construction embodying the invention.

Referring, now, to the drawings in which the same reference numerals indicate the same elements, a wood type element 5 is to be jointed to a grooved or mortised element 6, which may be a flat panel. The outer dimensions of the element 5 are substantially the same as the internal dimensions of the opening 7 in the element 6. Positioned in any suitable manner on the surface of element 5 is a plurality of abrasive type granules 8. It is to be understood that fibrous materials or a continuous filament could be used with or without the granules 8.

Figure 1:
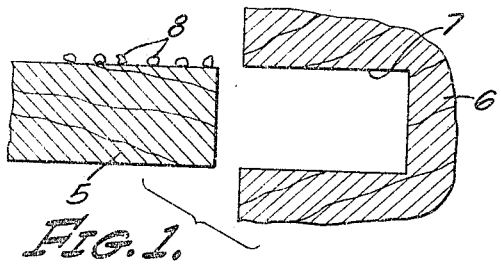
Figure 6:
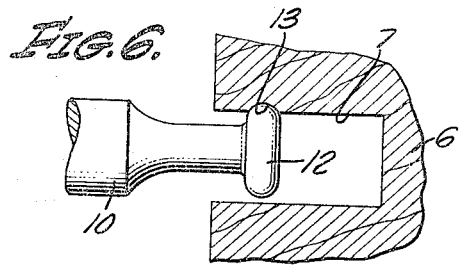
Figure 2:
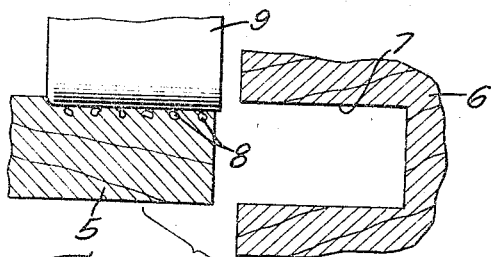
Figure 7:
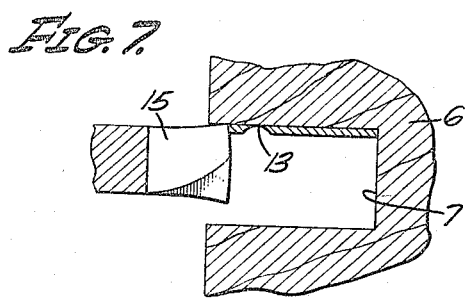

The first stage in forming the joint is shown in FIG. 2 wherein the element 5 has been compressed by mechanical means, such as a wheel 9, to a dimension less than the dimension of opening 7 in the element 6. During the compression operation by wheel 9, the granules 8, or other material, are embedded in the surface of element 5. Element 5 may also be cylindrical with a cylindrical opening 7. If the element 5 is cylindrical, it will be rolled under wheel 9, and the granules 8 will surround the compressed end of the element 5.

Figure 3:
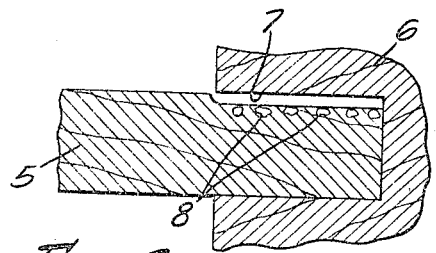
Figure 8:
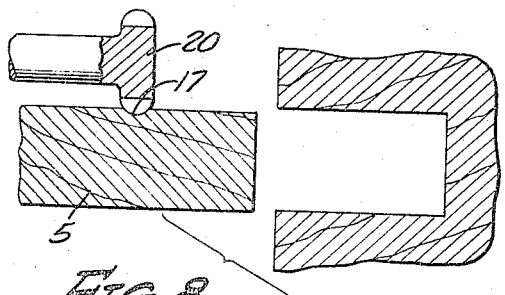

The element 5 is then inserted into the opening 7, as shown in FIG. 3, and the inserted portion of the element 5 is then moistened. This moistening stage causes the compressed portions of element 5 to expand and return to substantially their original form, which causes the granules 8 to partially emerge from the compressed surface and forces the granules 8 into the internal surface of the opening 7 as shown in FIG. 4. The final result of this stage causes the granules 8 to be partially embedded in the internal surface of the opening 7 while portions of the granules remain embedded in the surface of the element 5. This forms an interlock between elements 5 and 6 which requires no screws, nails, or other conventional fastening means. This bond has strength, is weatherproof, and particularly economical to construct.

FIG. 5 is an enlarged view of how the structure appears during the memory action. Although the granules 8 are shown in FIG. 5, these could be a continuous filament.

Referring, now, to FIGS. 6 to 9, inclusive, a cylindrical spindle 10 having a groove forming head 12, is a tool for compressing a groove 13 in the wall of the opening 7. This groove is formed by the compression of the wood in contact with the head 12. After the groove is formed, a tool such as a saw or router 15 is employed to remove the wood in the wall of opening 7 to the bottom of the groove 13, the part to be removed being shown in small cross-section in FIG. 7.

The next stage in this joining operation is to form a groove 17 in the element 5 in any suitable manner, such as by a tool 20, and then insert element 5 into the opening 7 so that the groove 17 is substantially opposite the area in which the groove 13 is formed. The next stage of construction is the moistening of the element 5 and the wall of the opening 7 where the groove 13 was formed. This moistening causes the compressed portion of groove 13 to now extend beyond the new inner surface of opening 7 as shown at 18, whereby the extended portion 18 engages the groove 17 of element 5 to provide the interlock shown in FIG. 9. Although only one groove is shown, a plurality of interlocking areas could be used. The extended portion 18 is at a distance from the bottom of the opening which is shorter than the groove 17 from the end of the element 5. By this construction, the element 5 is urged into the opening 7. This method and construction of joining has the same advantages as the first described joint.

I claim:
1. A method of joining two elements, at least one of which has an opening therein comprising compressing a portion of at least one of said elements to a dimension to permit said compressed portion to be accommodated in said opening, simultaneously embedding a plurality of interlocking elements into said compressed portion, engaging said elements, and expanding said compressed portion of said one element to substantially its original dimension by moistening said compressed portion in the engaged positions of said elements, said interlocking elements being partially forced out of said compressed portion and into the wall of said opening solely by the expansion of said compressed portion.

2. A method in accordance with claim 1 in which small hard granules are embedded in said compressed portion of said one element and the wall of said opening to form said interlocking elements.

3. A method in accordance with claim 1 in which a continuous filament is embedded in said compressed portion.

4. The method of joining two elements, one of which has an opening therein to accommodate a portion of said other element comprising compressing an area of said portion, simultaneously embedding hard granules into said compressed area of said portion during the compressing of said area, inserting said compressed area into said opening, and moistening said portion to return said area to substantially its original form to partially emerge said granules from said area and to partially embed said granules into an adjacent wall of said opening solely by the expansion of said compressed area.

5. A method in accordance with claim 4 in which said granules are sand-like and adapted to be completely embedded in said compressed area by external force and to be partially emerged from said area and partially embedded in a wall of said opening by the internal force of expansion.

References Cited

UNITED STATES PATENTS

| | | | |
|---|---|---|---|
| 917,433 | 4/1909 | Hofheimer | 144—314 |
| 2,149,043 | 2/1939 | Codwell | 29—459 |
| 2,560,411 | 7/1951 | Burns | 29—459 |

WILLIAM W. DYER, Jr., *Primary Examiner.*

R. J. ZLOTNIK, *Assistant Examiner.*